United States Patent [19]

Reed et al.

[11] 4,117,530
[45] Sep. 26, 1978

[54] METER RECEPTACLE ASSEMBLY

[75] Inventors: Ronald H. Reed, Versailles; William C. Miracle, Winchester, both of Ky.; Dwain G. McMullin, Aiken, S.C.

[73] Assignee: Square D Company, Park Ridge, Ill.

[21] Appl. No.: 811,509

[22] Filed: Jun. 30, 1977

[51] Int. Cl.² .............................................. H02B 9/00
[52] U.S. Cl. ................................... 361/365; 361/367; 339/198 M
[58] Field of Search ............................. 361/364–367, 361/369–371; 292/251, 307 R; 339/198 M; 174/52 R; 324/149, 156

[56] References Cited

.U.S. PATENT DOCUMENTS

| | | | |
|---|---|---|---|
| 3,076,167 | 1/1963 | Spencer | 361/367 |
| 3,263,130 | 7/1966 | Duvall | 361/367 |
| 3,307,081 | 2/1967 | Sloop | 361/369 |
| 3,382,415 | 5/1968 | Perkins | 361/369 |
| 3,636,498 | 1/1972 | McQuarrie | 339/198 M |
| 3,662,323 | 5/1972 | Stanback | 339/198 M |
| 3,912,357 | 10/1975 | Zahaykevich | 339/198 M |

*Primary Examiner*—Gerald P. Tolin
*Attorney, Agent, or Firm*—Norton Lesser; Richard T. Guttman

[57] ABSTRACT

The following specification describes a meter receptacle assembly utilizing an outer collar to overlap the meter flange base and latched to the cabinet in which the meter is mounted by interlocked tabs and a sealing wire. A trim or cover plate for the cabinet in turn overlaps a flange wall on the collar and is locked to the cabinet to prevent removal of the collar and unauthorized bypass of the meter. A cutout in the cover plate provides access and visibility for the sealing wire. Authorized bypass connections for the meter to permit its removal without disturbing service are facilitated by horn terminals whose ends project beyond the meter periphery to permit facile connections thereto.

5 Claims, 7 Drawing Figures

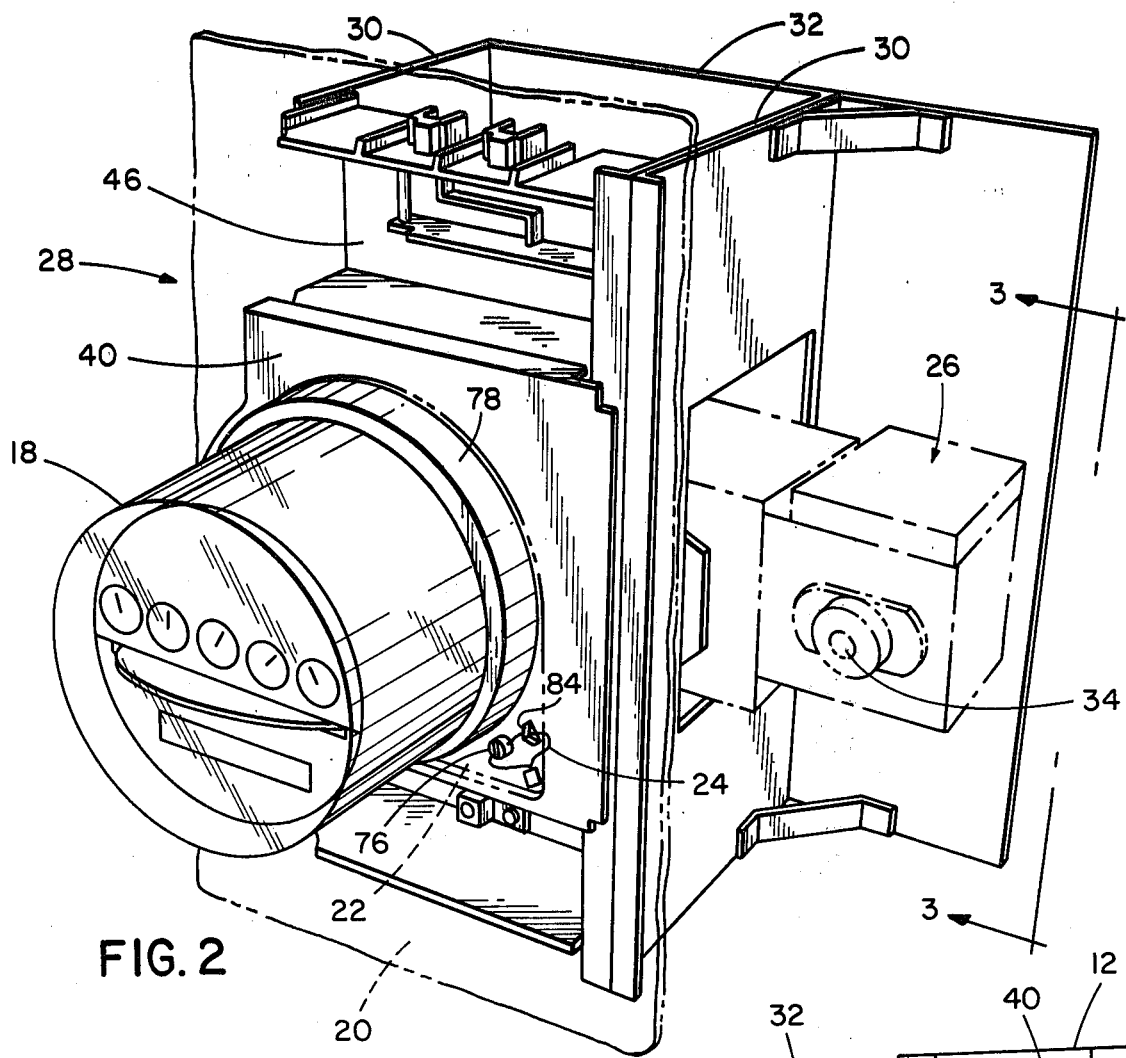
FIG. 2
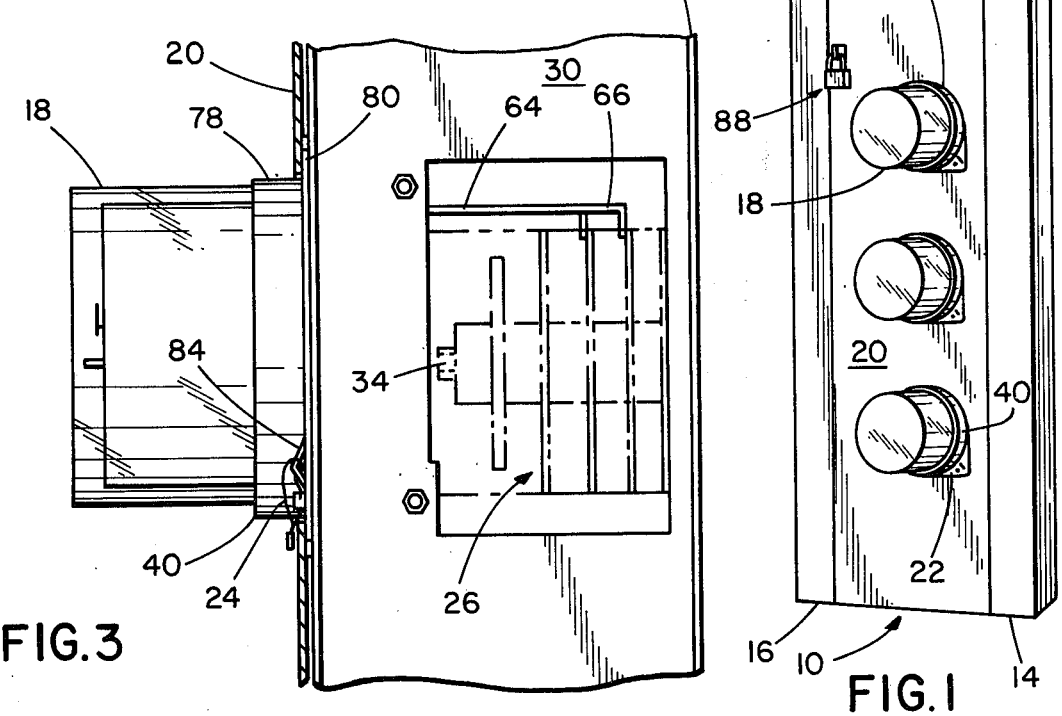
FIG. 3
FIG. 1

METER RECEPTACLE ASSEMBLY

FIELD OF THE INVENTION

This invention relates in general to meter receptacles and more particularly to an improved and more economical electrical meter receptacle assembly.

SUMMARY OF THE PRIOR ART

In prior electrical meter receptacles the connecting prongs of the meter having a flanged base was inserted through a receptacle ring or collar to establish connections between an electrical source and a load. A split sheet metal ring or collar was then assembled in overlapping relationship to the receptacle collar and to the flange base. A sealing wire passing through both ends of the split ring secured the meter against removal and presumably had to be broken to enable removal.

The split ring being of light gauge material is easily cut or otherwise distorted to permit removal of the meter and enables access to the electrical connections behind the meter for bypassing the meter. This condition permits the theft of electrical power.

On the other hand, bypass connections are often times necessary to permit meter removal and replacement or testing without disrupting service. Examples of such bypass arrangements are shown in U.S. Pat. Nos. 3,962,610 and 3,263,130 and these in essence incorporate mechanically movable switch elements for the socket terminals of the receptacle assembly which are relatively expensive and subject to problems.

SUMMARY OF THE INVENTION

In the present invention a fixed ring having a latch element receives the meter. An outer collar is engaged over the meter base and is provided with a flange wall having a tang engaged by the latch element in response to rotation of the outer collar to interlock the collar and ring with the meter base captured therebetween. The flange wall is also secured to the ring by a threaded member having a sealing wire which extends through a passage in the flange wall of the outer collar. The flange wall is then overlapped by the heavy gauge trim or front cover plate of the receptacle assembly which is padlocked or otherwise secured to the receptacle assembly housing. The cover plate has a cutout through which the threaded member and sealing wire are accessible and visible. Thus removal of the meter is prevented unless the front cover plate is first removed, which requires an authorized person.

The bypass arrangement simply includes a fixed prong for each socket terminal projecting beyond the periphery of the fixed ring and meter base. This permits connections to be established between the prongs corresponding to the line and ground terminals by simple conventional jacketed clips without removing the meter and disrupting service.

It is therefore among the objects of the present invention to provide an improved, economical outer receptacle assembly.

It is another object of the present invention to provide an improved electrical meter mounting assembly for preventing unauthorized removal of the meter from a meter receptacle or the unauthorized bypass of the meter.

It is still another object of the present invention to provide an improved and/or more economical bypass terminal assembly for use with an electrical meter.

Other objects together with the features of the present invention will become apparent on examination of the following specification and claims together with the drawings.

BRIEF DESCRIPTION OF THE DRAWINGS

FIG. 1 is an isometric view of a typical meter center having a plurality of meter receptacle assemblies incorporating the principles of the present invention.

FIG. 2 is an isometric view of a relevant portion of the meter center cabinet shown in FIG. 1 together with a receptacle assembly and a meter.

FIG. 3 is a side elevational view of the cabinet portion shown in FIG. 2.

DESCRIPTION OF THE PREFERRED EMBODIMENT

Figure 4:
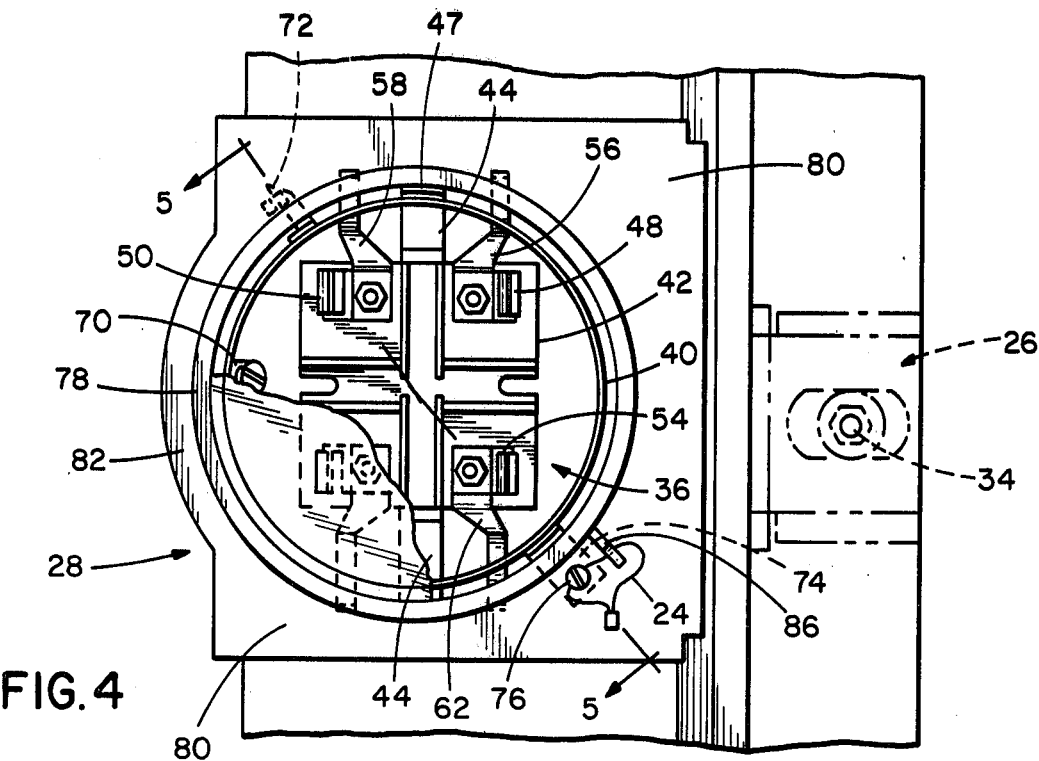
FIG. 4 is a front elevational view partially broken away of the meter receptacle assembly shown in FIG. 3.

In FIG. 1 a meter center is indicated generally by the reference character 10. The center 10 includes a meter receptacle cabinet or housing portion 12 having adjacent terminal box cabinet portions 14 and 16 to accommodate incoming and outgoing electrical connections to each of a plurality of watt hour meters 18 shown mounted in housing 12. The number of meters and size and/or relative location of the housings 12, 14 and 16 is of course selected in accordance with need or the number of branch circuits to be fed by an incoming electrical supply extended through one of the terminal cabinet portions 14 or 16.

The housing 12 includes a front cover plate or trim member 20 through which each meter projects and which is provided with an unsymmetrical cutout 22 for each meter to enable the condition a sealing wire 24 for each meter to be easily seen as indicated in FIG. 2.

The watt hour meters 18 each measure the quantity of electricity delivered to a respective customer from line and ground bus bars carried in one of the cabinet portions 14 or 16 and delivered to a customer after passage through the meter to appropriate wiring in the other terminal cabinet portion.

Figure 5:
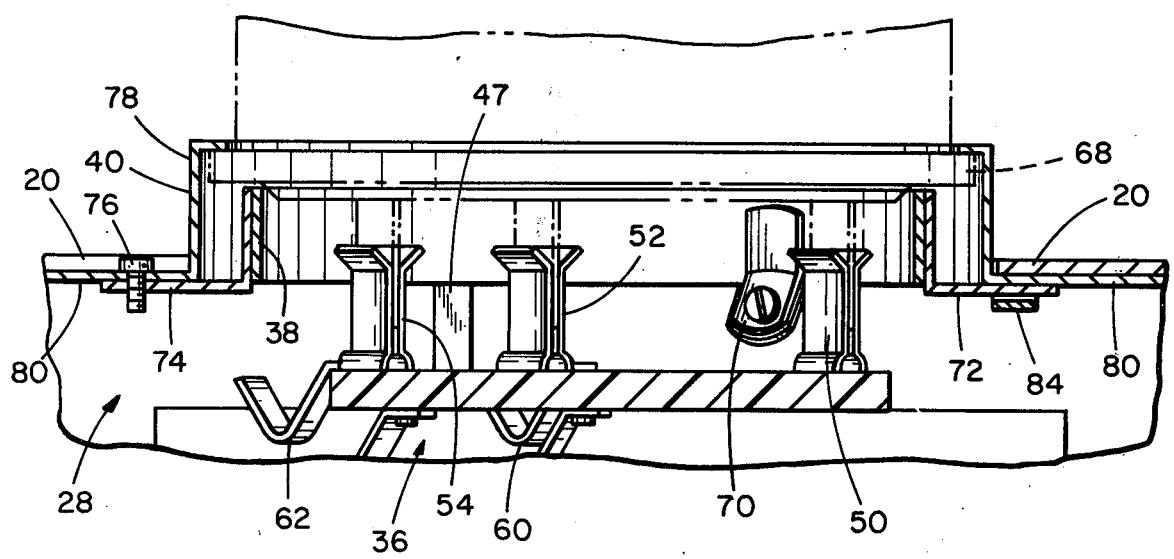
FIG. 5 is a sectional view taken along the lines 5—5 in FIG. 4.
Figure 6:
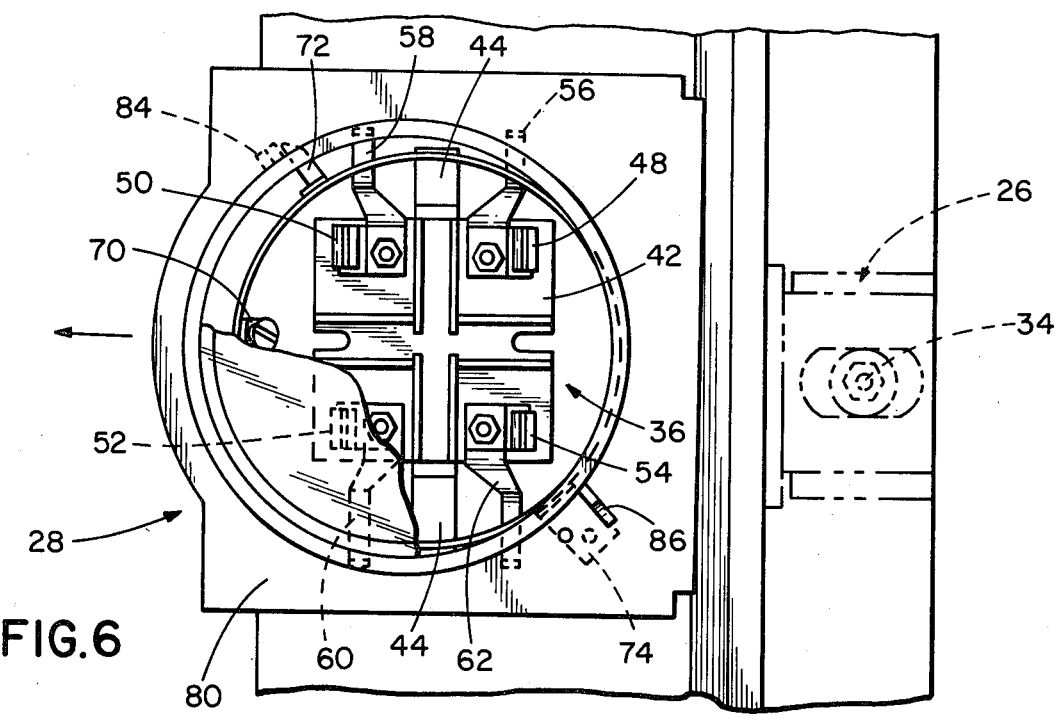
FIG. 6 is a view similar to FIG. 4 with the sealing wire removed.
Figure 7:
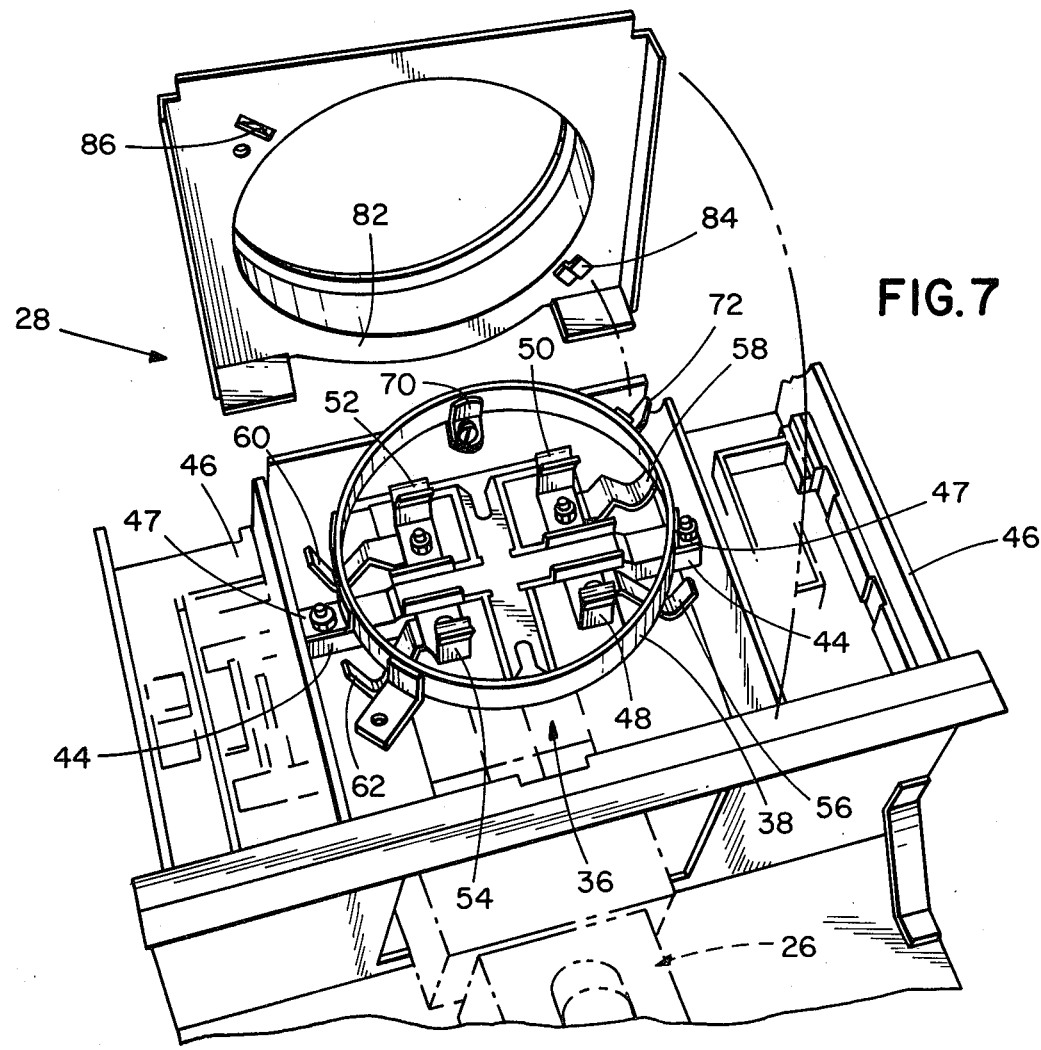
FIG. 7 is an exploded isometric view of the receptacle assembly and adjacent apparatus.

For this purpose each meter is provided with a conventional joint splice 26 seen in FIGS. 2 and 3 for connecting each bus bar in the portion 14, for example, to a respective meter bus bar directly behind a respective receptacle assembly 28 best seen in FIGS. 4–7. The joint splice 26 comprises one or more line buses and one or more ground buses, as required, and extends through an enlarged opening in the side partition walls 30 of cabinet. The splice together with the meter bus bars are conventionally supported at spaced positions on the back wall 32 of the housing 12 by respective insulated bolts such as 34.

The receptacle assembly 28 comprises a socket assembly 36, a fixed ring 38 and an outer cover or collar 40 overlapped by cover 20. The socket assembly includes a thick generally square insulating member or socket plate 42. Plate 42 has integral end lugs 44 extending from the respective upper and lower edges to wall flanges on adjacent insulated circuit breaker mounting pans or supports 46. Each lug 44 is secured to a respective pan 46 in common with a respective L-shaped tab 47 on fixed ring 38 by threaded fasteners. Each support 46 is conventionally secured between the side walls of housing portion 12 and carries appropriate branch connectors for connection to a respective circuit breaker.

The plate 42 has a generally square compartment adjacent each corner defined by barriers or partitions and in which are mounted respective jack terminals or socket receptacles 48, 50, 52 and 54 together with respective bypass or horn terminals 56, 58, 60 and 62. Two jack terminals or receptacles 48 and 50 adjacent one margin or edge of plate 42 are connected by means of respective metal straps 64 and 66 to respective meter bus bars and the other two terminals 52 and 54 are connected by means of respective straps to appropriate branch connectors in one of the adjacent mounting pans 46. One of the two receptacles 48 or 50 will thus extend a line connection through the meter to one of the terminals 52 or 54 to a branch connector in pan 46 and the other terminal 48 or 50 extends a ground connection through the meter and other one of the terminals 52 or 54.

The horn terminals include parallel metal tab portions secured in common with a respective one of terminals 48–54 to plate 42 and extend respectively in pairs past the upper edge and lower edges of the plate 42. The extending end of each bypass terminal tab is provided with a generally V-shaped free end with the closed V end overlapping the respective plate edge and displaced in the direction of the meter bus bars to provide a free side leg or prong projecting toward the plane of ring 38, but terminating rearwardly therefrom.

The socket receptacles 48–54 are, of course, adapted to receive respective prongs or terminals of a respective meter 18. The meter 18 is provided with a conventional glass or transparent housing enabling visual inspection of the meter dials. The meter is also provided with a flange base 68 indicated by broken lines in FIG. 5 having a circular periphery and engaged by ring 38.

The ring 38 is generally coaxial with the center of the plate 42 and is spaced forwardly thereof by tabs 48. An angular side tab 70 at the rear edge of the ring 38 is also secured to an angular tab on one of the side walls 30. The ring diameter selected so that the periphery of the ring lies at a radial position spaced outwardly of the jack terminals and radially inwardly of the horn terminals as does the flange base 68 whereby a bypass connection between the terminals 56 and 62 and between terminals 58 and 60 can be easily made and is easily visible.

Radially outwardly extending latch elements or tangs 72 and 74 are provided adjacent the rear edge of the fixed ring 38. The tangs 72 and 74 project in opposite directions generally along a diagonal line of the plate 42. Tang 72 is provided with a diagonally sheared end and tang 74 is provided with a threaded aperture for a threaded fastener 76.

The meter base flange 68 and the ring 38 are overlapped by the meter cover or collar 40. The meter collar includes an annular wall 78 having an annular radially inwardly extending lip at one end seated against the meter base flange and through which the transparent housing projects. The annular wall encircles the fixed ring 38 and at the end opposite the annular lip is provided with a radially outwardly extending flange wall 80.

The flange wall 80 has an arcuate portion 82 overlapping one of the side walls 30 to which tab 70 is fastened.

The remainder of the flange wall has a generally square configuration to define top, bottom and side edges including short side edge portions adjacent the arcuate portion 82. The top and bottom edges together with the short side portions adjacent the arcuate portion 82 have rearwardly extending legs thereon for receiving respective walls of the adjacent mounting pans 46 and for the wall 30 overlapped by portion 82. The portion of the flange wall 80 opposite portion 82 overlaps the other side wall 30.

The rear face of the flange wall 80 adjacent one corner has a tang or latch element 84 secured thereto in spaced relationship to capture the tang 72. The other corner of the flange wall 80 is provided with an aperture for alignment with the aperture in tab 74 to receive fastener 76 when the latch 84 has interlocked or captured tang 72. Wall 80 is also provided with an outwardly bent as offset leg 86 secured at both ends to the flange wall 80 to define a passage between leg 86 and the flange wall for receiving the conventional seal wire 24, which also passes through fastener 76.

With the meter conventionally installed and its prongs engaged in receptacles 48–54, the outer cover 40 is moved toward the fixed ring 38 with the rear tang or latch 84 offset in a counterclockwise direction from tab 72 and the margins of the flange wall 80 at an angle to the cabinet walls. When the collar lip bottoms against the meter base flange, the cover plate 40 is rotated to capture the tang 72 between the latch 84 and flange wall 80. The aperture in the opposite corner is then aligned with the aperture in the tang 74 and the threaded fastener 76 inserted to firmly secure the cover 40 in position. A seal wire may then be passed through the fastener 76 and between the offset leg 86 and the flange wall to complete a loop which is conventionally closed or sealed.

The trim or cover plate 20 is now placed over the housing portion 12 with each cutout portion 22 aligned with a respective seal wire 24 and engaged against each flange wall 80. The cover plate 20 is then secured by spaced latch assemblies one of which is indicated at 88 to the housing portion 12 to thereby prevent removal of the collars 40 and the meters 18. The latch assemblies 88 are conventional and can only be opened by authorized personnel.

To provide a bypass connection, the trim 20 is removed together with the collar 40. The meter 18 may remain in position while interconnected jacketed sockets or clips are engaged with horn terminals 48 and 54 respectively with terminals 58 and 60 respectively to bypass the meter, whereafter the meter may be replaced without disrupting service.

The foregoing description relates to an improved meter receptacle assembly whose inventive concepts are believed set forth in the accompanying claims.

We claim:

1. A meter receptacle assembly for a meter having a plurality of spaced contact blades extending outwardly from one surface of a flanged base at one end of a meter, said assembly including a cabinet, a plurality of socket receptacles, an insulating plate supported in said cabinet carrying said receptacles in spaced positions to receive a respective contact blade to establish a connection between one receptacle and a respective other receptacle, the improvement comprising:

a ring secured to said cabinet and adapted to engage said one surface of said flanged base in response to the receipt of said contact blades by said receptacles, a detachable annular collar removably attached to said cabinet and adapted to overlap said flanged base and ring, said collar having a radially outwardly extending flange wall at one axial end of said annular collar and a radially inwardly extending annular lip at the other axial end of said annular collar for abutment with said flanged base at a position spaced from said one surface, said flange wall extending radially outwardly of said collar and ring and having a passageway, said flange wall encircling said collar, a latch having one end secured to said flange wall and another end axially spaced in a direction opposite said annular lip from said flange wall and extending in one angular direction, a pair of circumferentially spaced tangs on said ring each extending radially outwardly of said ring, one of said tangs adapted to be received between said latch and said flange wall in response to the engagement of said collar with said flanged base and rotation of said collar in said one direction to restrain axial movement of said collar, a fastener extending from the other one of said tangs through said passageway in said flange wall to restrain rotational movement of said collar, and an outer cover plate overlapping said flange wall and secured to said cabinet with said cover plate having a cutout passing said fastener to enable access to said fastener.

2. In the assembly claimed in claim 1 a plurality of terminals each connected to a respective receptacle and fixed to said plate, each terminal extending to a respective position located radially outward of a respective edge of said insulating plate and having a V shaped tab with one leg of said tab extending axially from said ring in overlapping relationship to said plate and the other leg of said tab forming a free end prong spaced radially outwardly of said ring and extending axially toward said ring for enabling the extension of a bypass electrical connection for said meter in response to the disengagement of said collar from said ring and irrespective of the engagement of said flanged base with said ring.

3. In the assembly claimed in claim 1 an offset portion on said flange wall forming a passage, and a closed sealing wire loop extending through said passage and fastener.

4. The assembly claimed in claim 3 in which a plurality of insulating plates each having socket receptacles are carried in said cabinet with each plate having a respective meter, ring, collar and securing means, the improvement comprising a single cover plate having a plurality of spaced cutouts each aligned with a respective fastener, sealing wire and offset portion.

5. A meter receptacle assembly for a meter having a plurality of spaced contact blades extending outwardly from one surface of a flanged base at one end of said meter, said assembly including a cabinet, a plurality of socket receptacles, an insulating plate supported in said cabinet carrying said receptacles in spaced positions to receive a respective contact blade to establish a connection between one receptacle and a respective other receptacle, the improvement comprising:

a ring secured to said cabinet adapted to engage said flanged base in response to the receipt of said contact blades by said receptacles, a plurality of terminals each secured to said insulating plate and to a respective socket receptacle in electrical engagement with a respective receptacle, each terminal extending to a respective position spaced radially outwardly of a respective edge of said insulating plate and having a V shaped tab with one leg of said V shaped tab extending axially from said ring in overlapping relationship to said plate and the other leg of said V shaped tab forming a free end prong extending axially toward said ring and spaced radially outwardly of said ring to provide a bypass electrical connection for said meter irrespective of the engagement of said flanged base with said ring.

* * * * *